(No Model.)

C. P. CARLSON.
MACHINE FOR SQUARING OR TRUING EDGES OF SKELP IRON.

No. 599,034. Patented Feb. 15, 1898.

Witnesses.
J. P. Evans
H. J. Levis

Inventor:
Charles P. Carlson.
By O. D. Levis,
Attorney.

THE NORRIS PETERS CO., PHOTO-LITHO., WASHINGTON, D. C.

UNITED STATES PATENT OFFICE.

CHARLES P. CARLSON, OF McKEESPORT, PENNSYLVANIA, ASSIGNOR OF ONE-HALF TO J. C. O'CONNOR, OF SAME PLACE.

MACHINE FOR SQUARING OR TRUING EDGES OF SKELP-IRON.

SPECIFICATION forming part of Letters Patent No. 599,034, dated February 15, 1898.

Application filed March 17, 1897. Serial No. 628,061. (No model.)

*To all whom it may concern:*

Be it known that I, CHARLES P. CARLSON, a citizen of the United States, residing at McKeesport, in the county of Allegheny and State of Pennsylvania, have invented certain new and useful Improvements in Machines for Squaring or Truing the Edges of Skelp-Iron; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improved method and device for truing or preparing up the edges of skelp iron or steel in the manufacture of pipe.

In the method now in use the edges of material are not true and when placed together form a bad joint, which is difficult to weld. Therefore the object of my invention is to provide a means whereby the edges are formed perfectly true.

In describing the invention in detail reference is had to the accompanying drawings, forming a part of this specification, and wherein like figures of reference indicate similar parts, in which—

Figure 1:
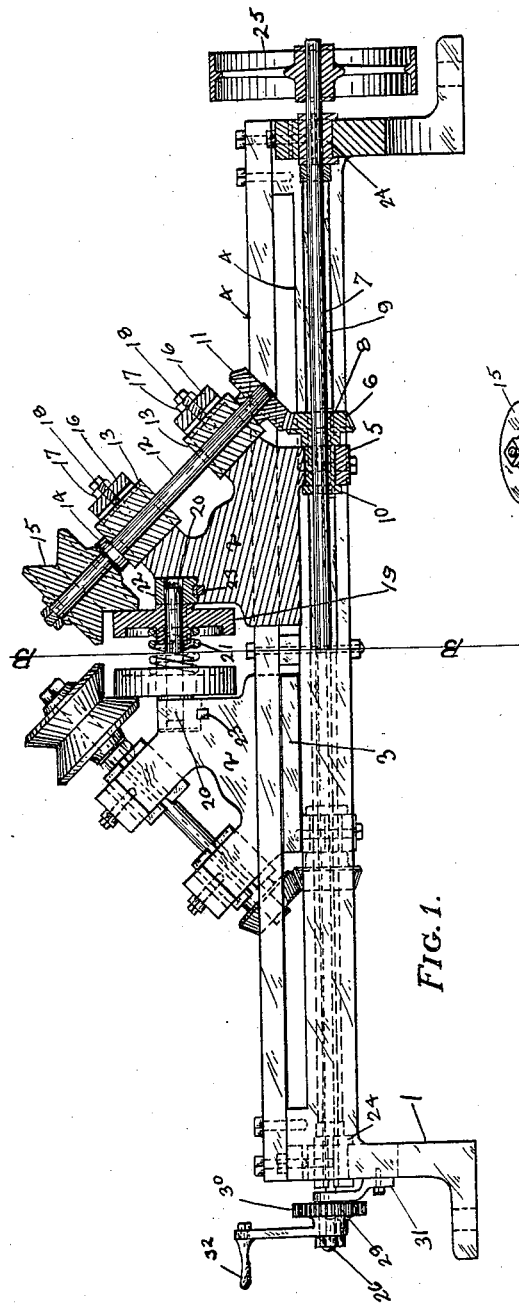
Figure 3:
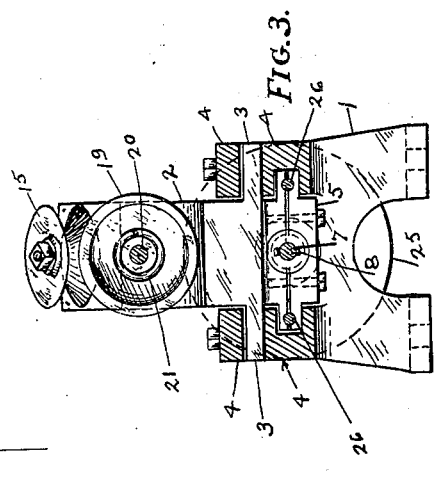
Figure 2:
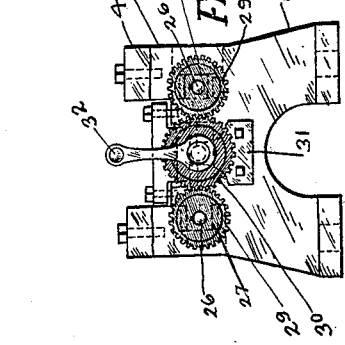

Figure 1 is a longitudinal side elevation of the device, partly shown in section. Fig. 2 is an end elevation of the same, looking at the left end of the same. Fig. 3 is a cross-sectional view through the device on line B B.

1 is the bed plate or frame of the machine. 2 is a pair of housings for the machine which are loosely attached to the bed-plate by means of the extended slides 3, which rest upon the bed-plate beneath the guide-pieces 4. Referring to one of the housings, (both being constructed and operated in a similar manner,) 5 is a bearing formed upon the under side thereof and has loosely fitted therein the bevel-wheel 6, which is held in place by the collar 10 and a shouldered portion formed upon the wheel at the opposite side of the bearing. The said gear is attached to the shaft 7 by means of a key 8, which is affixed to the wheel and engages with the keyway 9, which is formed lengthwise within the said shaft.

11 is a bevel gear-wheel attached to the end of the shaft 12 and is adapted to mesh with the said bevel-wheel 6. The said shaft 12 is fitted into the bearings 13, which are formed upon the housing 2 and are inclined at an angle of about forty-five degrees and are held in this position by the collar 14. Upon the upper end of the said shaft is secured the roll 15, which is provided with an angular groove, as shown. Caps 16 are attached to the housing by the bolts 18 and nut 17 for holding the bearings 13 in place. Extending down through the said caps and attached to the said bearings 13 are the set-screws 18, which are adapted to adjust the bearings when necessary. Between the housings are arranged the rolls 19, which are loosely keyed to the shaft 20 and forced tightly up in contact at their outer edges with the rolls 15 by means of a spiral spring, as shown. The bearings 22, into which the ends of the said shaft are fitted, are capable of being adjusted upwardly by means of the tapered keys 23.

At each end of the bed-plate are arranged the bearings 24, into which the shaft 7 is loosely fitted. Secured to one end of the said shaft 7 is the pulley 25, by means of which power is transmitted to the machine. The bracket 31, which is secured to the end of the bed-plate, is provided with a projecting pin or shaft and has loosely fitted thereon the gear-wheel 30, and the crank 32 is secured fast to the wheel. The shafts 26 are provided with right and left threads and are connected to the bearing portion 5 of the housings, and upon the ends of the said shafts are secured the gears 27, which mesh with the gear 30. The object of this arrangement is so that when the crank 32 is turned the housings may be moved either apart or closer together, according to the width of the material which it is desired to roll.

In operating the machine power is applied to the wheel 25, and by means of the gearing it is transmitted to the rolls 15 and 19. The material is then inserted over the said friction-rolls 19 and is carried over the same, and the angular rolls act upon the edge of the material, forming a true edge.

If it is desired to roll material of greater or less width, the crank 32 is operated in the desired direction to cause the rolls to be set farther apart or closer together.

Having thus fully shown and described my invention, what I claim as new, and desire to secure by Letters Patent, is—

1. A machine for truing or preparing the edges of skelp iron or steel preparatory to welding the same, comprising a pair of rolls arranged and adapted to operate upon the edges of the said material, a pair of frictional guide-rolls arranged and adapted to operate with and by the said rolls for truing the edge of the material, and a means whereby the said guide-rolls are held in frictional contact with the edge-truing rolls, substantially as shown and described.

2. A machine for truing or preparing the edges of skelp iron or steel preparatory to welding the same, comprising a pair of rolls arranged and adapted to operate upon the edges of the said material, a pair of frictional guide-rolls arranged and adapted to operate with and by the said edge-truing rolls, a means whereby the said guide-rolls are held in frictional contact with the edge-truing rolls and a means whereby the space between the rolls may be increased or decreased for material of various widths, substantially as shown and described.

3. A machine for truing the edges of skelp-iron comprising a bed having a shaft extending therethrough, having suitably mounted thereon housings, said housings being provided with inclined shafts having at one end gear-wheels, their inner ends being provided with angular grooved rolls, and spring-actuated rolls between said housings mounted upon suitable shafts, adapted to be held in contact with said angular rolls, substantially as described.

4. A machine for truing the edges of skelp-iron comprising a bed, a shaft extending through said bed having a pulley on one end, gear-wheels on said shaft, housings seated upon said bed provided with bearings for the reception of shafts, said shafts being provided at their outer ends with gear-wheels adapted to mesh with the said gear-wheels on the said shaft in the bed, the other ends of said shaft being provided with angular grooved rolls, and spring-actuated rolls working on suitable shafts adapted to be held in close contact with the said angular grooved rolls, substantially as described.

5. A machine for truing the edges of skelp-iron comprising the bed having a shaft extending therethrough, a pulley located at one end thereof, the other end being provided with adjusting mechanism, gear-wheels mounted on said shaft, adjustable housings situated upon said bed, provided with shafts working in adjustable bearings, the outer ends of said shafts being provided with gear-wheels, the inner ends being provided with angular grooved rolls, and spring-actuated rolls mounted between said housings adapted to be held in close contact with the said angular grooved rolls, substantially as described.

6. A machine for truing the edges of skelp-iron comprising the bed having a shaft extending therethrough, said shaft being provided at one end with a pulley the other end being provided with adjusting mechanism, beveled gear-wheels upon said shaft, housings loosely attached to said bed by means of extended slides resting upon guide-pieces, inclined shafts working in bearings upon said housings, said shafts being provided at the outer ends with beveled gear-wheels, their inner ends being provided with angular grooved rolls, and spring-actuated rolls mounted upon a shaft between said housings adapted to be held in contact with the said angular grooved rolls, substantially as described.

In testimony whereof I affix my signature in presence of two witnesses.

CHARLES P. CARLSON.

Witnesses:
ALEX. A. PATTERSON,
H. J. LEVIS.